April 6, 1965  F. J. CIZEK ETAL  3,176,502
PNEUMATIC GAGE
Filed July 26, 1963  2 Sheets-Sheet 1

INVENTOR
Frank J. Cizek
Shih N. Wu
BY Rockwell and De Lio
ATTORNEYS

April 6, 1965 F. J. CIZEK ETAL 3,176,502
PNEUMATIC GAGE
Filed July 26, 1963 2 Sheets-Sheet 2
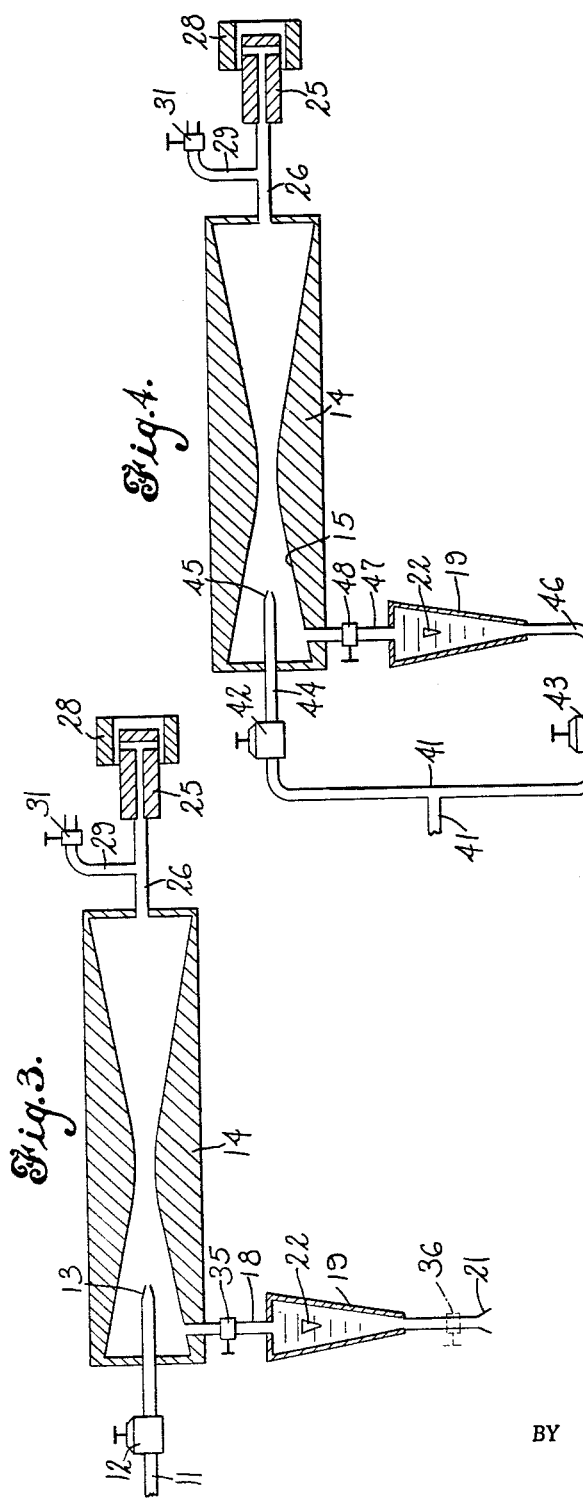
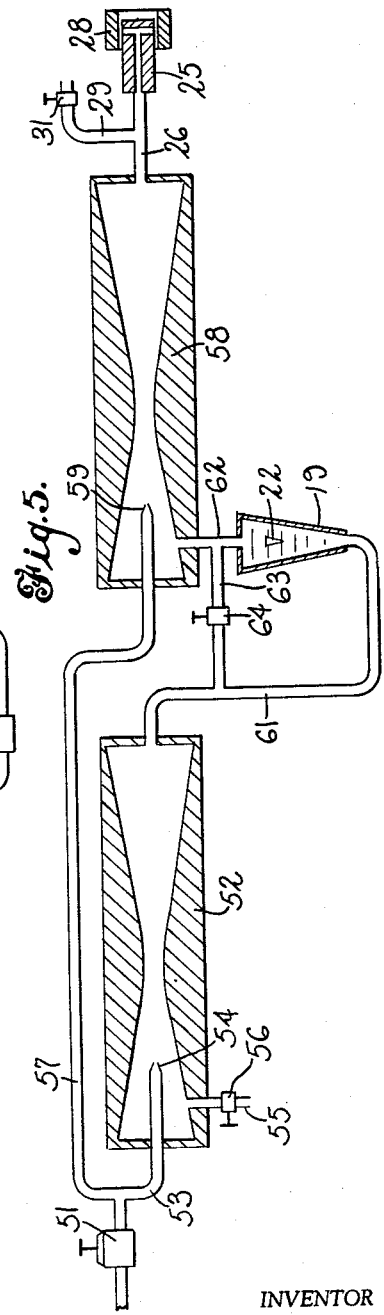
INVENTOR
Frank J. Cizek
Shih N. Wu
BY Rockwell and DeLio
ATTORNEYS United States Patent Office 3,176,502
Patented Apr. 6, 1965

3,176,502
PNEUMATIC GAGE
Frank J. Cizek and Shih Nang Wu, West Hartford, Conn., assignors to Pratt & Whitney Inc., a corporation of Delaware
Filed July 26, 1963, Ser. No. 297,931
17 Claims. (Cl. 73—37.5)

This invention relates generally to a pneumatic gage and more particularly to a novel pneumatic gaging system utilizing fluid to gage the size of a workpiece. More specifically, the invention relates to the novel construction of a gaging system utilizing a flow meter to indicate the size of the workpiece being measured.

Gaging utilizing fluid, usually air, under pressure is a developed art. In the systems first developed, a Bourdon-type gage was used to measure the back pressure created in a line by bringing a gaging nozzle close to the workpiece. The closer the surface of the workpiece to the nozzle, the higher was the back pressure. More recently, flow gages or flow meters have come into use. Instead of the gaging device being in parallel with the gaging nozzle as was the case with the Bourdon-type gage, the usual system utilizing a flow meter, places the flow meter in series with the system. In other words, fluid under pressure flows through the flow meter and thence through a gaging nozzle. A float within the flow meter is supported by the stream of fluid flowing through the flow meter. The proximity of the gaging nozzle to the surface being gaged affects the amount of fluid escaping from the gaging nozzle and thereby directly affects the amount of fluid flowing through the flow meter. The float within the flow meter responds to changes in the flow and such changes can be correlated with changes in size.

In both the back pressure and flow meter systems, one of the prime concerns is the over-all accuracy of the system. Included in this would be the sensitivity of the system and the magnification of changes. While sensitivity and magnification are interrelated, sensitivity is generally considered to be the ability of the system to respond to small changes. In other words, if the size of the workpiece being measured changes by .001″ and the float in the flow meter senses and indicates the change, but it fails to sense or indicate any change if the size of the workpiece changes by, for example, .0005″, then the meter would be considered to have a sensitivity of .001″. The magnification, on the other hand, would be a correlation between the change in the size of the workpiece and the movement of the float in the flow meter. In other words, if the workpiece size change is .001″ and in response thereto the float moves .250″, the magnification would then be said to the 250. Of course, magnification and sensitivity are interrelated to the extent that, since the flow meter is read visually, small changes in workpiece size at low magnification may be so small that the change in the height of the float cannot be visually observed, while the same amount of change in workpiece size at high magnification may show up as a readable float movement.

Accordingly, an object of this invention is to provide a novel gaging system utilizing fluid under pressure and incorporating a flow meter, the gaging system being of high accuracy and having good sensitivity.

Another object of the invention is to provide a gaging system incorporating an injector pump being provided with a plurality of fluid supply sources, at least one of said sources being through a flow meter.

A further object of the invention is to provide a gaging circuit incorporating means for expanding fluid within a chamber to thereby draw fluid through a flow meter for indicating the size of a workpiece being gaged.

Still other objects and advantages of the invention will in part be obvious and will in part be apparent from the specification.

Generally speaking, in accordance with this invention, fluid under pressure is fed into an injector pump having a throat portion therein and the outlet of the injector pump is connected to a gaging plug adapted to measure the size of particular workpieces. The flow meter is also connected to the injector pump behind the throat in such a manner that a pressure drop across the flow meter causes a flow of fluid, usually air, through the flow meter thereby supporting the float within the flow meter. Changes in flow from the gaging nozzle cause changes in flow within the injector pump thereby affecting the flow in the flow meter causing the float to respond to such changes. Controls are also provided for adjusting the magnification of and for zeroing the system. Refinements of the system also contemplate utilization of damping means to steady the float at high magnification.

The apparatus accordingly comprises the features of construction, combinations of elements, and arrangements of parts which will be exemplified in the constructions hereinafter set forth, and the scope of the invention will be indicated in the claims.

For a fuller understanding of the invention, reference is had to the following description taken in connection with the accompanying drawings, in which:

FIG. 3 is a schematic representation of another modified form of the gaging system of FIG. 1;

FIG. 4 is a schematic representation of still another modified form of the gaging system of FIG. 1; and FIG. 5 is a schematic representation of a gaging system utilizing in series modified forms of the gaging system of FIG. 1.

Before describing the system in detail, it should be noted that the system is adapted for operation as a fluid gaging system and, thus, any fluid medium may be utilized. In the usual type of gaging system, air is used as a fluid because of its satisfactory operation and plentiful supply. Therefore, the description hereafter will make reference to air throughout. It should be understood, however, that the system is by no means limited for use only with air.

Figure 1:
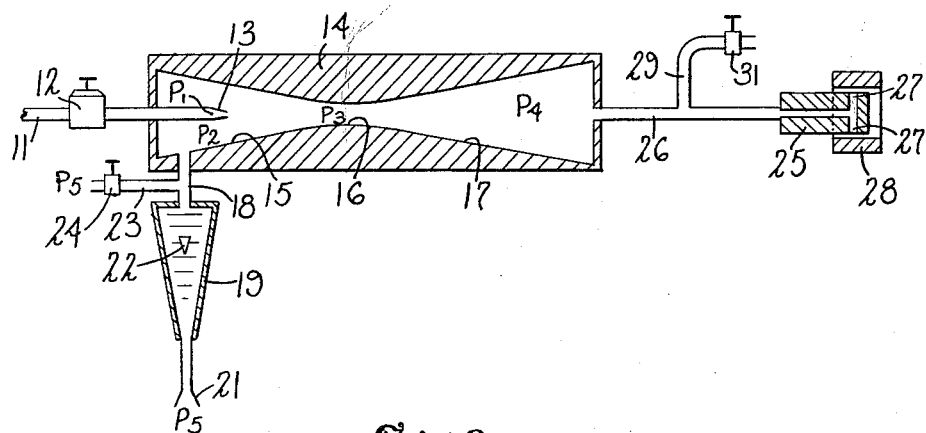
FIG. 1 is a schematic representation of a gaging system embodying my invention.

Referring now to FIG. 1, the basic system is shown. Air under pressure is fed through a line 11 from a compressor (not shown) or other suitable source through a pressure regulator 12 and is emitted from a nozzle 13. The nozzle is located within an injector pump 14 having a converging-diverging interior cross-section. The injector pump may be divided generally into two portions, the first portion being a converging chamber 15 which ends at a throat 16. The second portion is the diverging chamber 17 which extends from the throat. As shown in FIG. 1, nozzle 13 extends part way into the converging chamber 15 toward the throat. The air passing through line 11 may be considered the primary source. A secondary source of supply to chamber 15 is also provided through a line 18. Line 18 is connected to the top of a flow meter 19 which has a lower inlet 21 open to free air. Within the flow meter 19 is a float 22. The flow meter and float may be of any known type and are depicted schematically to facilitate description. A line 23 is connected to line 18 intermediate its connection between the injector pump and the flow meter. Line 23 is open to the atmosphere and carries an adjustable valve 24 for adjusting the amount of flow in line 23 from zero to the maximum.

A gage plug 25 is connected to the outlet side of the injector pump through a line 26. Gage plug 25 may carry a plurality of gaging nozzles 27 of a suitable type to gage the particular workpiece required. Of course, gage plug 25 would be connected to the line in such a manner that gage plugs can be readily changed to suit the particular job. The gage plug shown is adapted to measure the bore of a workpiece such as indicated generally at 28. A line 29 communicating with the atmosphere is connected into line 26 between the gage plug and the exit side of the injector pump. An adjustable valve 31 is connected in line 29 to control the flow therethrough.

The system operates as follows. Air, at a pressure $P_1$ determined by the setting of regulator 12 enters nozzle 13 and is expanded into chamber 15 to a pressure which is less than $P_1$. The primary air flows through chamber 15 wherein the pressure decreases to a minimum $P_3$ at throat 16. Preferably, the design of the throat as compared with the size of nozzle 13, would be such that $P_1$ would be greater than $P_3$. The air expands as it enters chamber 17 to a pressure $P_4$ and from chamber 17 the air flows through line 26 to the gage plug and escapes through gaging nozzles 27. The high velocity flow of air from nozzle 13 into chamber 15 causes a vacuum in chamber 15 and at the inlet of the secondary source indicated at pressure $P_2$, which would be less than atmospheric pressure $P_5$ at the inlet 21 to the flow meter. The pressure differential between $P_5$ and $P_2$ causes air to flow through the flow meter into chamber 15. This flow supports float 22 within the flow meter and the height of the float within the flow meter is in direct proportion to the flow through the flow meter. Assuming valve 24 closed and valve 31 in a fixed open position, the height of float 22 which may be measured by suitable calibrations on the flow meter will read the size of workpiece 28 since the total flow through the injector pump is controlled by the clearance between gaging nozzles 27 and the bore of the workpiece and the flow through valve 31. If a workpiece having a bore whose diameter is smaller than the bore of workpiece 28 is now substituted for workpiece 28, the walls of the bore will be closer to the gaging nozzle, thereby reducing the amount of flow from the gaging nozzles. The closing off of these nozzles will increase pressure $P_4$, thereby reducing the flow through the chambers. Since the flow through nozzle 13 is not affected by the flow through the chambers, the flow through the secondary source is thereby reduced, thereby reducing the flow through the flow meter and changing the reading indicated by the float. If the workpiece bore is larger, a converse situation will result.

When setting up the system to measure a particular series of workpieces, a workpiece of known size is placed over the gage plug and the float reading observed. If the float rises above or below a mid-scale or zero reading, it is desirable to bring the float back to the zero reading so that a maximum range of plus or minus deflection may be provided for. The zero setting can be controlled by adjusting valve 31 to increase or decrease the amount of air that is leaked to atmosphere through line 29. An increase in flow through line 29 will increase the flow through the secondary source thereby raising the float while a decrease in flow through line 29 will decrease the flow through the secondary source thereby lowering the float. Once the zero setting is adjusted for the workpiece of known size, all other workpieces may be measured relative thereto and the float will read deviations, plus or minus, from the known size.

As briefly mentioned above, it may also be desirable to adjust the magnification of the system to adjust the number of units that the float will move for each unit of change of the size of the workpiece. This may be done by adjusting valve 24. Since the flow of air into chamber 15 through line 18 is determined by the flow through the primary source and the flow through line 26, the adjustment of valve 24 has little or no affect over the flow of air into the chamber from the secondary source. It does, however, control the proportion of the flow provided through line 23 as compared with that provided through the flow meter, the total flow from the secondary source into the chamber being the sum of the flow through line 23 and the flow meter. Therefore, the opening of valve 24 will increase the flow through line 23 thereby reducing the flow through the flow meter. With reduced flow, the changes in flow through the flow meter resultant from changes in size of the workpiece being measured will have less effect on the height of the float, thereby reducing the magnification of the system. Conversely, as valve 24 is closed, a greater proportion of the flow from the secondary source passes through the flow meter, thus providing that changes in flow have a greater effect on the flow through the flow meter to increase the magnification of such changes. It will be seen immediately that the adjustment of magnification of the system must be effected concurrently with adjusting the zero setting since both valves 24 and 31 will exercise control over the height of the float.

The basic system described above has given excellent results in terms of accuracy, sensitivity and magnification. While the gage plug shown in FIG. 1 is of the type for gaging the size of an internal bore, it is to be understood that the system can be used with any type of gage plug for gaging any and all types of surfaces. One substantial advantage of the system just described is that the air flowing through the flow meter is drawn from the atmosphere, thereby providing for the flow of relatively clean room air through the flow meter thus increasing its life and regularity and accuracy of operation. In contradistinction, most of the gaging systems in use today utilizing flow meters, pass air from the pressure source through the flow meter. As is well known by those skilled in the art, compressed air, even if filtered, is usually quite dirty and filled with excess oil and moisture which can cling to the sides of the flow meter and to the float, thereby introducing gaging error.

Figure 2:
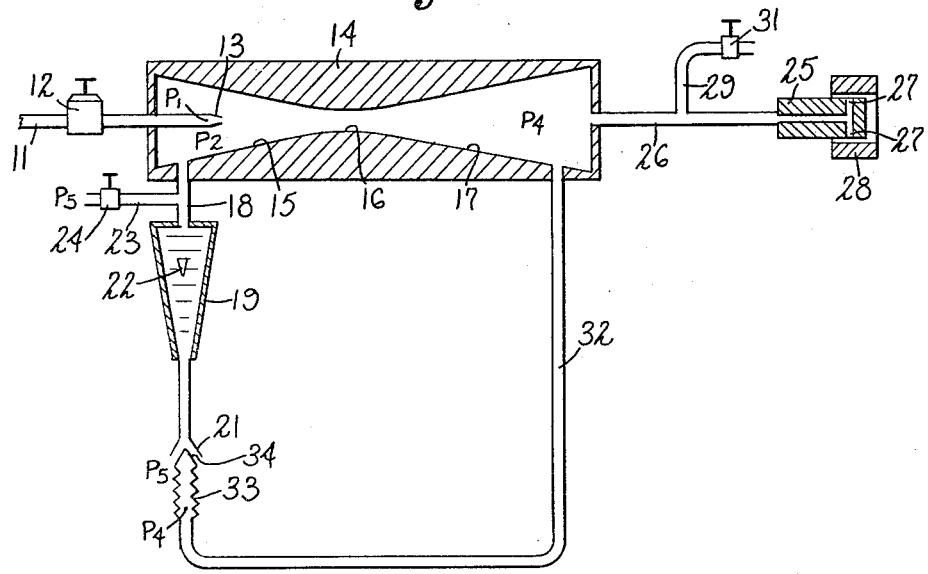
FIG. 2 is a schematic representation of a modified form of the gaging system of FIG. 1.

The system shown in FIG. 1 and described above provides best results when close tolerances are maintained. If the desired tolerances are not adhered to, readability at magnifications of 10,000 to 1 or higher may be impaired because of an accompanying slight float oscillation or vibration. To improve the readability at such high magnification the system of FIG. 2 is preferred. In most respects, the system is the same as that shown in FIG. 1 with like reference numerals indicating like parts. However, the system of FIG. 2 additionally includes a line 32 connected into injector pump 14 in chamber 17. Mounted to the outer end of line 32 and communicating therewith is a flexible, pressure-responsive element such as a bellows 33 having a closed valve-like end 34 disposed opposite lower inlet 21. At high magnification, the oscillation or vibration of float 22 is due to turbulence within chamber 15 as it leaves throat 16. The turbulence causes a slight oscillation in the pressure at the throat which affects the flow through the flow meter. This oscillation in pressure $P_4$ in the chamber affects the pressure $P_4$ in bellows 33 through line 32. When pressure $P_4$ increases, bellows 33 expands, causing valve-like end 34 to move closer to lower inlet 21 thereby slightly reducing the flow through the flow meter. Conversely, when pressure $P_4$ decreases, the bellows contracts and slightly increases the flow through the flow meter.

As it is well known, orifices have the ability to damp flow variations by their frictional nature. Principally, lower inlet 21 acted on by the bellows 33 and the valve-like end 34 serves as such an orifice. Its area and thus its frictional characteristic is varied by the action of the bellows 33 in response to the change in pressure $P_4$ as described before. In this manner, oscillations or vibrations of float 22 are damped and a more accurate reading at high magnification is thereby obtained. At lower magnifications, the bellows portion of the system of FIG. 2 is ineffective since pressure $P_4$ will be lower at lower magnifications. With a lower pressure $P_4$, bellows 33 contracts and valve-like end 34 has virtually no effect over the flow rate through lower inlet 21. Therefore, the control that bellows 33 exerts over the system for steadying the float within the flow meter is directly proportional to the magnification. Thus, automatic damping is thereby obtained only when necessary.

A modified form of the basic circuit of FIG. 1 is shown in FIG. 3. In the circuit of FIG. 3, different means are provided for adjusting the magnification of the gaging system. Instead of utilizing a tap to atmosphere in line 18 carrying an adjustable valve, a valve 35 is inserted directly in line 18 and the line 23 is omitted. By adjusting valve 35, the flow through flow meter 19 can be controlled. As indicated previously, control of the flow through the flow meter independently of the injector pump adjusts the magnification of the circuit as a multiple of the deviation from standard sensed by the gaging head. A second valve 36 is shown in phantom in FIG. 3 in the lower inlet 21. In some applications, it may be preferable to place the valve in the lower inlet rather than in the exit line at the top of the flow meter. Of course, normally only one of the valves would be utilized. In other words, the circuit could be constructed using valve 35 to control magnification or a valve 36 could be used to control magnification and valve 35 would be omitted.

Another modified form of the basic circuit is shown in FIG. 4. In this form of the circuit, air under pressure is supplied through a line 41 from a compressor (not shown) to two separate regulators 42 and 43. The regulated air from regulator 42 enters injector pump 14 through a line 44 having a nozzle 45 at the outer end thereof. Nozzle 45 would be the same as nozzle 13 in the basic circuit. The outlet side of the injector pump may be the same as that shown in the basic circuit. The difference resides in the provision of the second regulator 43 which feeds air through a line 46 to the inlet or bottom of flow meter 19. The outlet line 47 of the flow meter is connected through a valve 48 into the converging chamber 15 of the injector pump. By a comparison of the FIG. 4 circuit with the basic circuit, it immediately becomes apparent that the major difference is that air under regulated pressure passes through the flow meter in the modified circuit, whereas the air passing through the flow meter in the basic circuit is drawn from the atmosphere. Note that in the modified circuit separate regulators must be provided for the primary and secondary sources since it is desirable to independently control the pressure from the sources. In the FIG. 4 circuit, valve 48 is shown in the line 47 to control and adjust the magnification of the gaging circuit. It would not be desirable to use the atmospheric tap in line 47 in the modified circuit because the air passing through the flow meter would be at greater than atmospheric pressure. A tap in line 47 could be used if the tap was supplied with air at the same pressure as the air supplied to the inlet of the flow meter.

In certain applications, greater sensitivity and/or magnification may be obtained by utilizing the multiple effects of more than one injector pump. A typical circuit for the utilization of series-connected injector pumps is shown in FIG. 5. In this circuit, air under pressure is supplied through a regulator 51 to the first injector pump 52 through a line 53 connected to the regulator. As before, a nozzle 54 is carried on the end of line 53 within the first injector pump. An air tap 55 controlled by a valve 56 enters the converging chamber of the first injector pump behind the nozzle to provide the secondary source. Another line 57 is also connected to the outlet of regulator 51 and therefore carries air at the same pressure as the pressure in line 53. Line 57 provides the primary source for the second injector pump 58, the line carrying a nozzle 59 at the end thereof for expanding the air at the converging chamber. If the system comprises only two injector pumps, the outlet to the gage plug would be the same as in the basic circuit. An outlet line 61 is also provided from the outside of the first injector pump. This line connects to the inlet side or bottom of flow meter 19 to supply the air which will pass through and support float 22. The top or outlet side of the flow meter connects to the second injector pump 58 through a line 62, thereby providing the secondary source for the second injector pump. A tap to line 61 through a line 63 and a valve 64 may be provided in line 63 or a valve may be inserted in line 62. In either case, the magnification of the gaging circuit would be controlled thereby. Furthermore, an additional control will be effected through valve 56 thereby multiplying the magnification of the system and increasing the sensitivity by the utilization of the series-connected injector pumps. It is also contemplated that in certain applications it may be desirable to connect two or more injector pumps in parallel to multiply the advantageous results derived from such a system.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:
1. A gaging circuit comprising;
   (a) an injector pump having
      (i) a converging chamber,
      (ii) a diverging chamber communicating with said converging chamber through a throat section,
      (iii) a primary inlet to said converging chamber,
      (iv) a secondary inlet to said converging chamber, and
      (v) an outlet from said diverging chamber,
   (b) a source of fluid under regulated pressure supplying said primary inlet,
   (c) a nozzle within said converging chamber connected to said primary inlet, said nozzle being downstream of said secondary inlet,
   (d) a flow meter having an inlet and an outlet,
      (i) said outlet communicating with said secondary inlet, and
   (e) a gage plug connected to said injector pump outlet.
2. The gaging circuit of claim 1 and further including means cooperating with said secondary inlet for adjustably controlling the magnification of the gaging circuit.
3. The gaging circuit of claim 2 wherein said magnification controlling means comprises a line open at one end and communicating at the other end with said secondary inlet and an adjustable valve within said line.
4. The gaging circuit of claim 2 wherein said magnification controlling means comprises an adjustable valve in said secondary inlet.
5. The gaging circuit of claim 2 wherein said magnification controlling means comprises an adjustable valve in said flow meter inlet.
6. The gaging circuit of claim 1 and further including means cooperating with said injector pump outlet for adjustably controlling the zero setting of the gaging circuit.
7. The gaging circuit of claim 6 wherein said zero setting controlling means comprises a line open at one end and communicating at its other end with said injector pump outlet, and an adjustable valve in said line.

8. The gaging circuit of claim 1 and further including a second source of fluid under regulated pressure, said source being connected to said flow meter inlet.

9. The gaging circuit of claim 8 and further including means cooperating with said secondary inlet for adjustably controlling the magnification of the gaging circuit.

10. The gaging circuit of claim 1 and further including a line communicating at one end with said diverging chamber and a bellows, said bellows communicating with the other end of said line, said bellows being disposed with relation to said flow meter inlet to variably control the flow through said inlet in response to fluctuations in pressure in said diverging chamber.

11. In a gaging circuit, the combination comprising a primary source of fluid under regulated pressure, a chamber, means for expanding fluid from said primary source within said chamber, a gaging device communicating with said chamber, and a flow meter communicating with said chamber upstream of said expanding means in such a manner that fluid is drawn into said chamber through said flow meter thereby providing a secondary source.

12. The gaging circuit of claim 11 and further including adjustable bleed means cooperating with said gaging device for adjusting the flow meter reading during dynamic operation of the circuit.

13. The gaging circuit of claim 11 and further including means cooperating with said flow meter for adjustably controlling the flow therethrough to adjust the multiplication factor of changes in readings on the flow meter responsive to a change in size of a workpiece gaged by the gaging device.

14. The gaging circuit of claim 11 and further including means communicating with said chamber to control the flow of fluid through said flow meter in response to fluctuations in pressure in said chamber.

15. The gaging circuit of claim 11 and further including a second source of fluid under pressure communicating with said flow meter to provide the fluid that will be drawn through the flow meter.

16. In a gaging circuit the combination comprising a primary source of fluid under regulated pressure, a first chamber, a second chamber, means for expanding fluid from said primary source within both of said chambers, a gaging device communicating with said second chamber, a flow meter having an inlet and an outlet, the inlet of said flow meter communicating with said first chamber, the outlet of said flow meter communicating with said second chamber, and an adjustable orifice in said first chamber upstream of the expanding means in said chamber.

17. The gaging circuit of claim 16 and further including adjustable means cooperating with said flow meter to adjustably control the flow therethrough.

References Cited in the file of this patent
UNITED STATES PATENTS

| | | |
|---|---|---|
| 1,971,271 | Mennesson | Aug. 21, 1934 |
| 2,403,897 | Aller | July 16, 1946 |
| 2,513,374 | Stead et al. | July 4, 1950 |
| 2,523,564 | Fortier | Sept. 26, 1950 |
| 2,539,624 | Huggenberger | Jan. 30, 1951 |
| 2,560,883 | Mennesson | July 17, 1951 |
| 2,564,527 | Fortier | Aug. 14, 1951 |
| 2,571,557 | Fortier | Oct. 16, 1951 |
| 2,589,251 | Heinz | Mar. 18, 1952 |
| 2,614,424 | Housen | Oct. 21, 1952 |
| 2,621,511 | Van Dorn | Dec. 16, 1952 |
| 2,626,464 | Mennesson | Jan. 27, 1953 |
| 2,665,579 | Fortier | Jan. 12, 1954 |
| 2,684,568 | Senger | July 27, 1954 |
| 2,707,389 | Fortier | May 3, 1955 |
| 2,795,855 | Worthen | June 18, 1957 |
| 2,845,791 | Loxham | Aug. 5, 1958 |
| 2,846,871 | Worthen | Aug. 12, 1958 |
| 2,925,692 | Hitchner | Feb. 23, 1960 |
| 2,963,901 | Aller | Dec. 13, 1960 |
| 2,976,718 | Baker | Mar. 28, 1961 |
| 3,037,372 | Herzberg | June 5, 1962 |

FOREIGN PATENTS

| | | |
|---|---|---|
| 349,631 | Great Britain | June 4, 1931 |